(12) United States Patent  (10) Patent No.: US 7,708,255 B2
Conrad  (45) Date of Patent: May 4, 2010

(54) THERMAL DEBURRING APPARATUS WITH RAPID VENTILATION

(75) Inventor: Hans-Juergen Conrad, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 602 days.

(21) Appl. No.: 11/624,833

(22) Filed: Jan. 19, 2007

(65) Prior Publication Data

US 2007/0221875 A1  Sep. 27, 2007

(30) Foreign Application Priority Data

Mar. 24, 2006  (DE)  ........................ 10 2006 013 667

(51) Int. Cl.
*F16K 1/00*  (2006.01)
*F16K 15/00*  (2006.01)
(52) U.S. Cl. .................... 251/333; 251/332; 251/63
(58) Field of Classification Search .................. 251/62, 251/63, 63.5, 63.6, 332, 333
See application file for complete search history.

(56) References Cited

U.S. PATENT DOCUMENTS

| 2,240,521 | A | * | 5/1941 | Schnell | ...................... 251/332 |
| 4,014,510 | A | * | 3/1977 | Smith | ........................ 251/63 |
| 4,015,815 | A | | 4/1977 | Leisner et al. | |
| 5,193,577 | A | * | 3/1993 | de Koning | ............. 137/516.29 |
| 5,618,025 | A | * | 4/1997 | Barron et al. | ................ 251/210 |

FOREIGN PATENT DOCUMENTS

| DE | 24 24 148 | 12/1975 |
| EP | 1 232 821 | 8/2002 |
| EP | 1 232 822 | 8/2002 |

* cited by examiner

*Primary Examiner*—John K Fristoe, Jr.
(74) *Attorney, Agent, or Firm*—Michael J. Striker

(57) ABSTRACT

A thermal deburring apparatus has a pressure-tight closeable deburring chamber connected to an environment via a ventilation passage having a passage direction; a ventilation valve closing said ventilation passage and having a stationary valve seat encompassing said ventilation passage, a valve tappet that is movable in said passage direction, and a seal affixed to said valve tappet.

13 Claims, 1 Drawing Sheet

THERMAL DEBURRING APPARATUS WITH RAPID VENTILATION

CROSS-REFERENCE TO A RELATED APPLICATION

The invention described and claimed hereinbelow is also described in German Patent Application DE 10 2006 013 667.5 filed on Mar. 24, 2006. This German Patent Application, whose subject matter is incorporated here by reference, provides the basis for a claim of priority of invention under 35 U.S.C. 119(a)-(d).

BACKGROUND OF THE INVENTION

The invention relates to a thermal deburring apparatus with rapid ventilation.

EP 1 232 822 A1 has disclosed a thermal deburring apparatus of this kind, the content of which is fully included herein by reference. FIG. 1 of the above-mentioned application shows a thermal deburring apparatus with a deburring chamber 2 that is connected to the environment via a ventilation passage 22, in fact via the exhaust unit 23. The ventilation passage 22 can be closed by means of a ventilation valve 21. A rapid ventilation of this kind is used for the controlled discharge of the highly pressurized combustion gases after the explosion of the fuel gases, which produces the deburring of the work pieces 3 introduced into the deburring chamber 2.

FIG. 5 of EP 1 232 822 A1 shows an embodiment of the ventilation valve 21 in more detail. It includes a valve seat 28 that is connected to the deburring chamber 2 and a valve tappet 25 that can move in the direction of the ventilation passage 15. The seal 26 is mounted on the valve seat.

This ventilation valve has the disadvantage of a very high hold-closed force of the valve tappet during the explosion, i.e. the force required to press the valve tappet against the valve seat so that no combustion gases can escape.

SUMMARY OF THE INVENTION

The object of the present invention therefore is to reduce the hold-closed force without increasing the flow resistance of the ventilation passage.

In keeping with these objects and with others which will become apparent hereinafter, one feature of the present invention resides, briefly stated, in a thermal deburring apparatus, comprising a pressure-tight closeable deburring chamber connected to an environment via a ventilation passage having a passage direction; a ventilation valve closing said ventilation passage and having a stationary valve seat encompassing said ventilation passage, a valve tappet that is movable in said passage direction, and a seal affixed to said valve tappet.

This attainment of the object is based on the knowledge that in addition to the explosion pressure, the hold-closed force depends solely on the inner diameter of the seal since this defines the area that is subjected to the explosion pressure. According to EP 1 232 822 A1, the seal is situated around the ventilation passage, which is why its inner diameter must be significantly greater than the inner diameter of the ventilation passage. By contrast with this, in the ventilation valve according to the present invention, the inner diameter of the seal can be reduced without changing the inner diameter of the ventilation passage.

It is possible for the valve tappet to be driven by an actuator, preferably a simply acting fluid cylinder, with the combination of the valve tappet and actuator being detachably connected to the deburring chamber, preferably by means of a bayonet connection. This can serve to facilitate servicing the ventilation valve because the valve seat and the valve tappet can be completely separated from each other so that the seal and the sealing surface of the valve seat are freely accessible. The latter components experience a particularly high degree of wear because they are subjected to the explosion pressure. It is therefore necessary to replace them on a regular basis.

The preferred embodiment of the detachable connection as a bayonet connection, i.e. a connection produced by first executing a straight joining motion in the direction of the ventilation valve axis followed by a rotating locking motion around the ventilation valve axis, has the advantage that the assembly and disassembly of the combination of the valve tappet and actuator can be executed with particular ease and speed. A bayonet connection also has the advantage that the joint surfaces that must withstand the explosion forces can be embodied as very large. A detent connection can be provided, which secures the bayonet connection in the locked position so as to prevent an unintentional opening.

The preferred embodiment of the actuator as a simply acting fluid cylinder, in particular a short-stroke cylinder, has the advantage that it can be embodied as very short in the direction of the ventilation valve axis so that the combination of the valve tappet and actuator is easy to handle during servicing. As a drive fluid, it is possible to use compressed air or hydraulic fluid, compressed air usually being less expensive.

In addition, the seal can be constituted by an inner ring, an outer ring, and a deformable ring core, which are accommodated in an adapted recess of a seal support, namely the valve tappet; the two rings can be brought into contact with the associated valve seat so that the deformable ring core is subjected to pressure on all sides. EP 1 232 822 A1 essentially anticipates this embodiment form. A seal of this kind has the disadvantage that it can very easily come loose from the adapted recess because friction forces are the only thing securing it in place.

In this connection, it is particularly important to bear in mind that the deformable ring core is preferably a PTFE ring that is deformed only due to the relatively high contact forces and with the subsequent relaxation, springs back in a partially elastic fashion so that gaps can occur between the seal and the recess. This problem is particularly serious if the seal is situated on a moving part such as the valve tappet or if the seal can fall out of the adapted recess due to its own weight.

In order to eliminate this disadvantage, it is preferable for at least one ring and/or the valve tappet to have a displacement recess for the deformable ring core. In a seal of this kind, the deformable ring core flows into the displacement recesses due to the action of the contact pressure. Upon subsequent relaxation, the elastic recovery of the deformable ring core is insufficient to eliminate the form-locked engagement between the components of the seal. The seal is thus secured in a form-locked fashion that prevents it from coming loose. In this connection, it should be noted that the seal blanks can be embodied without undercuts so that they can be separately produced in an inexpensive fashion and then assembled without any difficulty. The form-locked engagement is first produced during operation of the thermal deburring apparatus.

A seal of this kind can also be advantageously used at other locations in the thermal deburring apparatus, for example at the opening through which work pieces are inserted into the deburring chamber. For this reason, the applicant is seeking separate patent protection for this seal.

The displacement recess can be embodied in the form of a circumferential groove so that it can be simply and inexpensively manufactured by means of turning. Such a displacement recess does not in fact prevent a rotation of the seal, but this is of no consequence because the seal, the valve tappet, and the valve seat are preferably embodied as rotationally symmetrical in relation to the ventilation valve axis so that they remain fully functional in every rotation position.

The inner diameter of the inner ring can essentially be equal to the inner diameter of the ventilation passage. As a result of this embodiment, the ventilation valve has essentially the same flow cross-section for the explosion exhaust gases as the ventilation passage and therefore does not function as a throttle restriction that limits a rapid removal of the combustion gases. The clock cycle of the thermal deburring apparatus is correspondingly short.

The valve seat can also be comprised of an annular valve insert whose end surface is provided with a sealing surface, which, viewed in its longitudinal section, is embodied as convex and preferably tapers to a point. Embodying the valve seat as a separate valve insert has the advantage that it can be easily replaced in the event of wear. In addition, it can be manufactured of a different, more wear-resistant material than the rest of the deburring apparatus. The sealing surface that tapers to a point has the advantage that it is less expensive to manufacture than a flattened sealing surface according to EP 1 232 822 A1—FIG. 5 because it does not require the maintenance of as many tolerance-encumbered longitudinal dimensions. The convex form is required so that the rings of the seal are pressed against the adapted recess in order to prevent the deformable ring core from flowing out.

The inner diameter of the valve insert can be smaller in some sections than the inner diameter of the inner ring. In this way, the inner ring of the seal in particular is protected from the explosion pressure wave in the fashion of a labyrinth seal because the valve insert is situated in the direct path of the explosion pressure wave to the seal.

This embodiment can be improved if a protective extension of the valve tappet protrudes into the valve insert when the ventilation valve is closed. This produces a narrow gap between the valve insert and valve tappet that additionally slows the explosion pressure wave on its way to the seal, thus protecting the seal from damage.

In addition, the outer circumference surface of the valve insert can be provided with a static seal, preferably an O-ring. This seal is required so that the fuel gases, which are introduced into the combustion chamber at a high pressure, cannot escape along the outer circumference surface of the valve insert. The preferred embodiment has the advantage of preventing the valve insert from being pulled out by the high static friction of the seal rubber as the ventilation valve opens.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
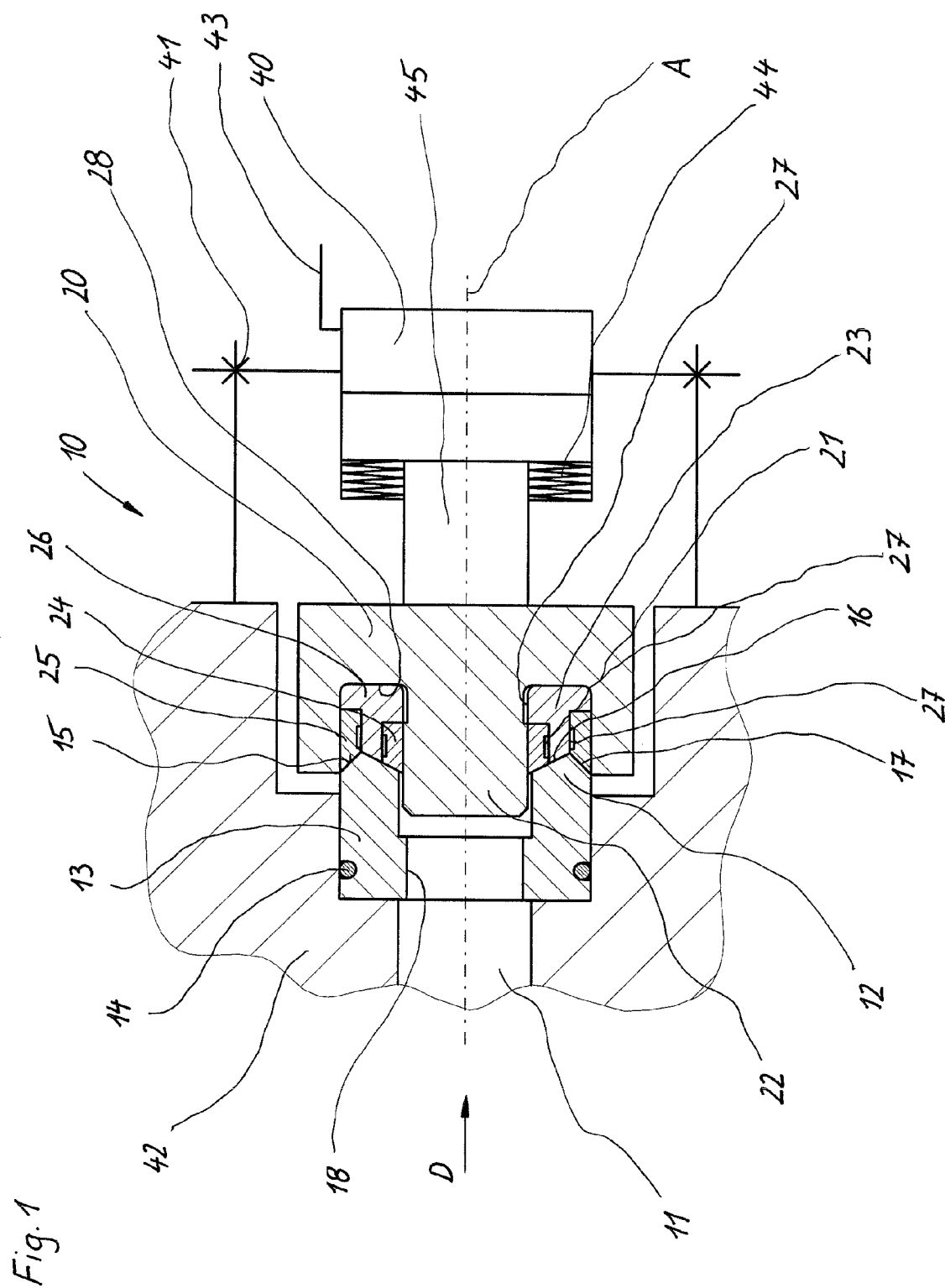
FIG. 1 shows a longitudinal section through a ventilation valve of a thermal deburring apparatus according to the present invention.

The ventilation valve 10 shown in FIG. 1 is used in a thermal deburring apparatus according to EP 1 232 822 A1, in fact as a replacement for the ventilation valve according to FIG. 5 thereof. For this reason, reference is hereby made to said application with regard to the general construction of the thermal deburring apparatus.

The ventilation valve 10 is built into the housing 42 of the deburring chamber and connected to it via the ventilation passage 11. The axis A of the ventilation valve extends in the passage direction D.

The ventilation valve 10 has a valve seat 12 and a valve tappet 20. The valve tappet 20 is attached to an actuator 40 shown in simplified fashion, namely the piston rod 45 of a simply acting pneumatic cylinder, so that it can be moved in the direction of the ventilation valve axis A. During the closing movement of the ventilation about 10, the driving force is produced by means of compressed air supplied via the compressed air line 43. The restoring force for opening the ventilation valve 10 is generated by the return spring 44. The actuator is detachably connected to the housing 42 of the deburring chamber by means of a bayonet connection 41 that is likewise depicted in simplified fashion.

A seal 23 is affixed to the valve tappet 20 and can be brought into contact with the valve seat 12. The valve tappet thus constitutes the seal support 21. The seal is comprised of an inner ring 24, an outer ring 25, and a deformable ring core 26 that are accommodated in an adapted recess 28. The two rings 24, 25 are comprised of brass or rust-resistant steel, while the deformable ring core 26 is manufactured of PTFE. When the ventilation valve 10 closes, the deformable ring core 26 is subjected to pressure on all sides so that it flows into the displacement recesses 27 that are provided in both rings 24, 25 and in the valve tappet 20. In all three cases, the displacement recesses 27 are embodied in the form of circumferential grooves.

The valve tappet 20 is provided with a cylindrical protective extension 22 on whose outer circumference surface the ring 24 is situated without play. The inner diameter of the inner ring 24 is equal to the inner diameter of the cylindrical ventilation passage 11.

The valve seat 12 is comprised of an annular valve insert 13, which is manufactured as a one-piece turned component made of steel. At the end surface oriented toward the valve tappet, the valve insert 13 has the convex sealing surface 15, which is comprised of an inner conical surface 16 and an outer conical surface 17 so that it tapers to a point. The cusp is situated in the extension of the joining surface between the inner ring 24 and the ring core 26, thus resulting in an uncomplicated end surface of the ring core.

The smallest inner diameter of the valve seat 13 is less than the inner diameter of the ventilation passage 11. This smallest inner diameter is only present along a section 18 of the valve insert so that a sealing labyrinth is produced in connection with the protective extension 22 when the ventilation valve 10 is closed.

A rubber O-ring 14 is provided on the outer circumference surface of the valve insert 13 and is installed in a circumferential groove in a prestressed fashion.

It will be understood that each of the elements described above, or two or more together, may also find a useful application in other types of constructions differing from the types described above.

While the invention has been illustrated and described as embodied in a thermal deburring apparatus with rapid ventilation, it is not intended to be limited to the details shown, since various modifications and structural changes may be made without departing in any way from the spirit of the present invention.

Without further analysis, the foregoing will so fully reveal the gist of reveal present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A thermal deburring apparatus, comprising:
   a pressure-tight closeable deburring chamber connected to an environment via a ventilation passage having a passage direction;
   a ventilation valve closing said ventilation passage and having a stationary valve seat encompassing said ventilation passage, a valve tappet that is movable in said passage direction, and a seal affixed to said valve tappet,
   wherein said seal is composed of an inner ring, an outer ring, and a deformable ring core that is disposed between said inner and outer rings,
   wherein said valve tappet has a recess adapted to said inner and outer rings,
   wherein said inner and outer rings and said deformable ring core are accommodated in said recess, and
   wherein said inner and outer rings are bringable into contact with said stationary valve seat, such that said deformable ring core is enclosed by said recess, said inner and outer rings, and said stationary valve seat on all sides, such that said deformable ring core is subjected to pressure on all sides.

2. A thermal deburring apparatus as defined in claim 1; and further comprising an actuator which drives said valve tappet, said valve tappet with said actuator being detachably connected to said deburring chamber.

3. A thermal deburring apparatus as defined in claim 2, wherein said actuator is configured as a single acting fluid cylinder.

4. A thermal deburring apparatus as defined in claim 2; and further comprising a bayonet connection through which said valve tappet and said actuator are detachably connected to said deburring chamber.

5. A thermal deburring apparatus as defined in claim 1, wherein at least one element selected from the group consisting of at least one of said rings, said seal support, and both has a displacement recess for said deformable ring core, wherein said displacement recess is disposed adjacent to said deformable ring core.

6. A thermal deburring apparatus as defined in claim 5, wherein said displacement recess is configured as a circumferential groove.

7. A thermal deburring apparatus as defined in claim 1, wherein an inner diameter of said inner ring is essentially equal to an inner diameter of said ventilation passage, wherein said inner ring is cylindrical.

8. A thermal deburring apparatus as defined in claim 1, wherein said valve seal includes an annular valve insert with an end surface having a sealing surface which, viewed in its longitudinal section, is configured as a convex sealing surface.

9. A thermal deburring apparatus as defined in claim 8, wherein said convex sealing surface of said end surface of said annular valve insert tapers to a point, and wherein said point is disposed between the inner and outer rings.

10. A thermal deburring apparatus as defined in claim 8, wherein said valve insert has an inner diameter which in some sections is smaller than an inner diameter of said inner ring.

11. A thermal deburring apparatus as defined in claim 8, wherein said valve tappet has a protective extension which protrudes into said valve insert when said ventilation valve is closed.

12. A thermal deburring apparatus as defined in claim 8; and further comprising a static seal provided on an outer circumferential surface of said valve insert.

13. A thermal deburring apparatus as defined in claim 12, wherein said static seal is configured as an O-ring.

* * * * *